United States Patent [19]
Lambright

[11] Patent Number: 5,820,238
[45] Date of Patent: Oct. 13, 1998

[54] CABINET

[75] Inventor: Michael D. Lambright, Archbold, Ohio

[73] Assignee: Sauder Woodworking Co., Archbold, Ohio

[21] Appl. No.: 859,540

[22] Filed: May 20, 1997

[51] Int. Cl.⁶ .................................................. A47B 81/00
[52] U.S. Cl. ........................ 312/291; 312/321.5; 312/324
[58] Field of Search ................................... 312/291, 295, 312/321.5, 326, 324, 329, 9.42, 9.44

[56] References Cited

U.S. PATENT DOCUMENTS

| | | | |
|---|---|---|---|
| 184,375 | 11/1876 | Hansen | 312/329 |
| 1,543,980 | 6/1925 | Blood | 312/324 X |
| 1,559,705 | 11/1925 | Jackson | 312/291 X |
| 1,798,800 | 3/1931 | MacKnight | 312/329 |
| 3,078,133 | 2/1963 | Schauer | 312/321.5 |
| 3,089,745 | 5/1963 | Postula et al. | 312/324 |
| 4,502,742 | 3/1985 | Neff | 312/321.5 X |
| 5,145,245 | 9/1992 | Fierthaler | 312/321.5 |
| 5,558,418 | 9/1996 | Lambright et al. | 312/321.5 |

FOREIGN PATENT DOCUMENTS

| | | | |
|---|---|---|---|
| 332963 | 11/1903 | France | 312/291 |
| 75777 | 11/1893 | Germany | 312/291 |
| 108670 | 2/1925 | Switzerland | 312/321.5 |

*Primary Examiner*—Peter M. Cuomo
*Assistant Examiner*—Hanh V. Tran
*Attorney, Agent, or Firm*—Emch, Schaffer, Schaub & Porcello Co., L.P.A.

[57] ABSTRACT

A cabinet including at least one end. At least one inner door is pivotally mounted between open and closed positions on the end. At least one outer door is pivotally mounted between open and closed positions on the end. Each of the doors includes at least one shelf upon which articles can be positioned for storage.

24 Claims, 17 Drawing Sheets

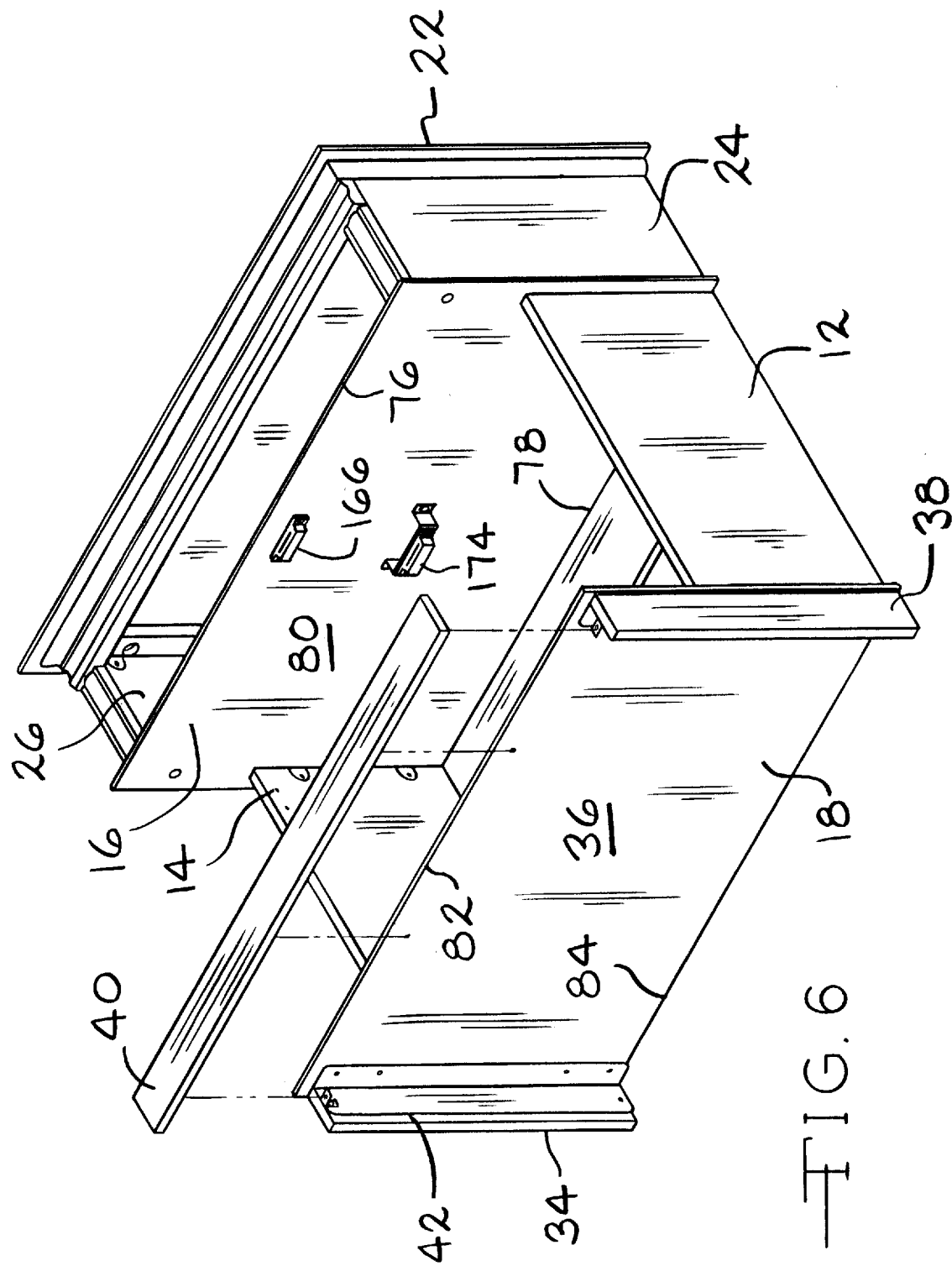

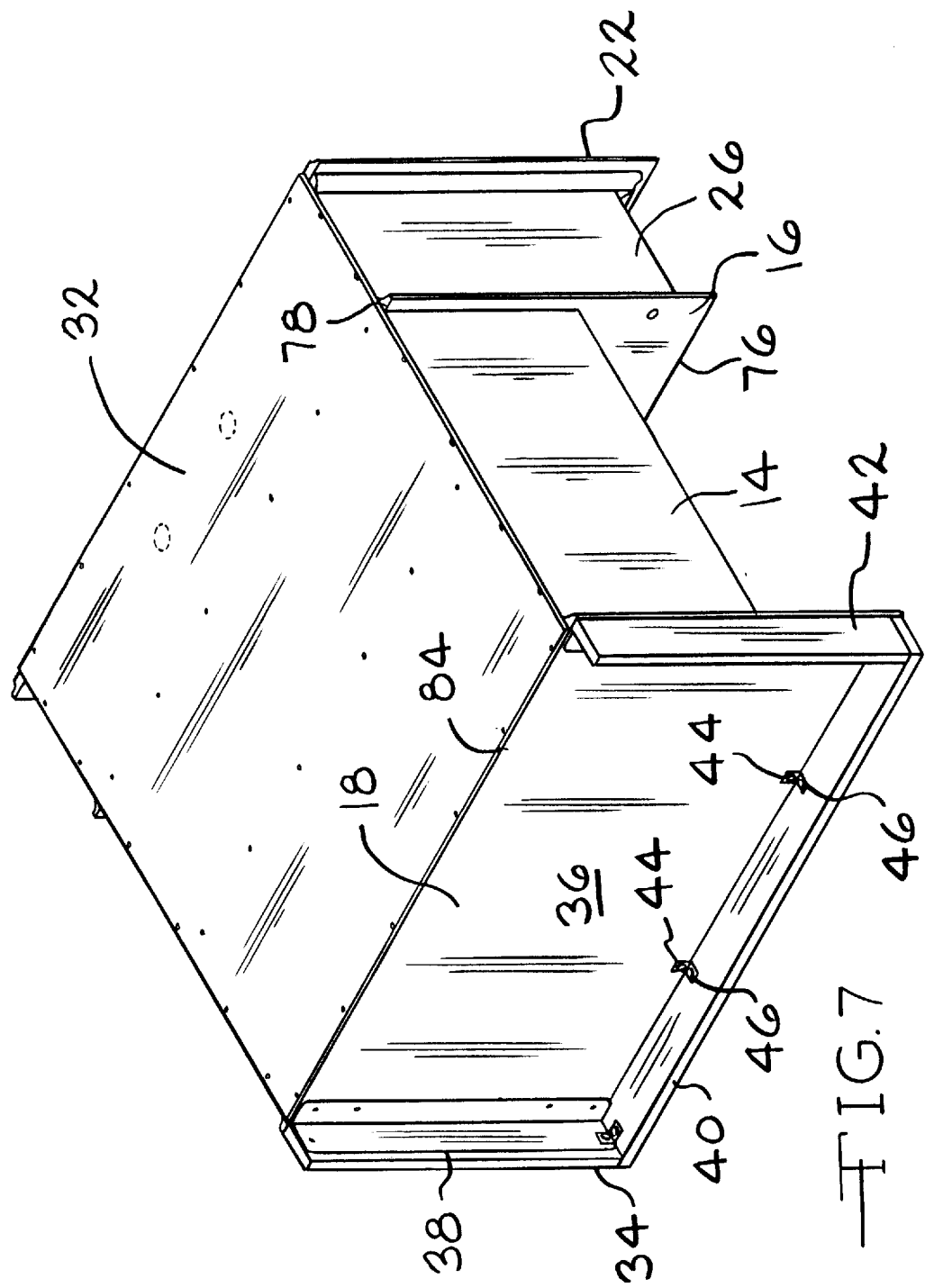

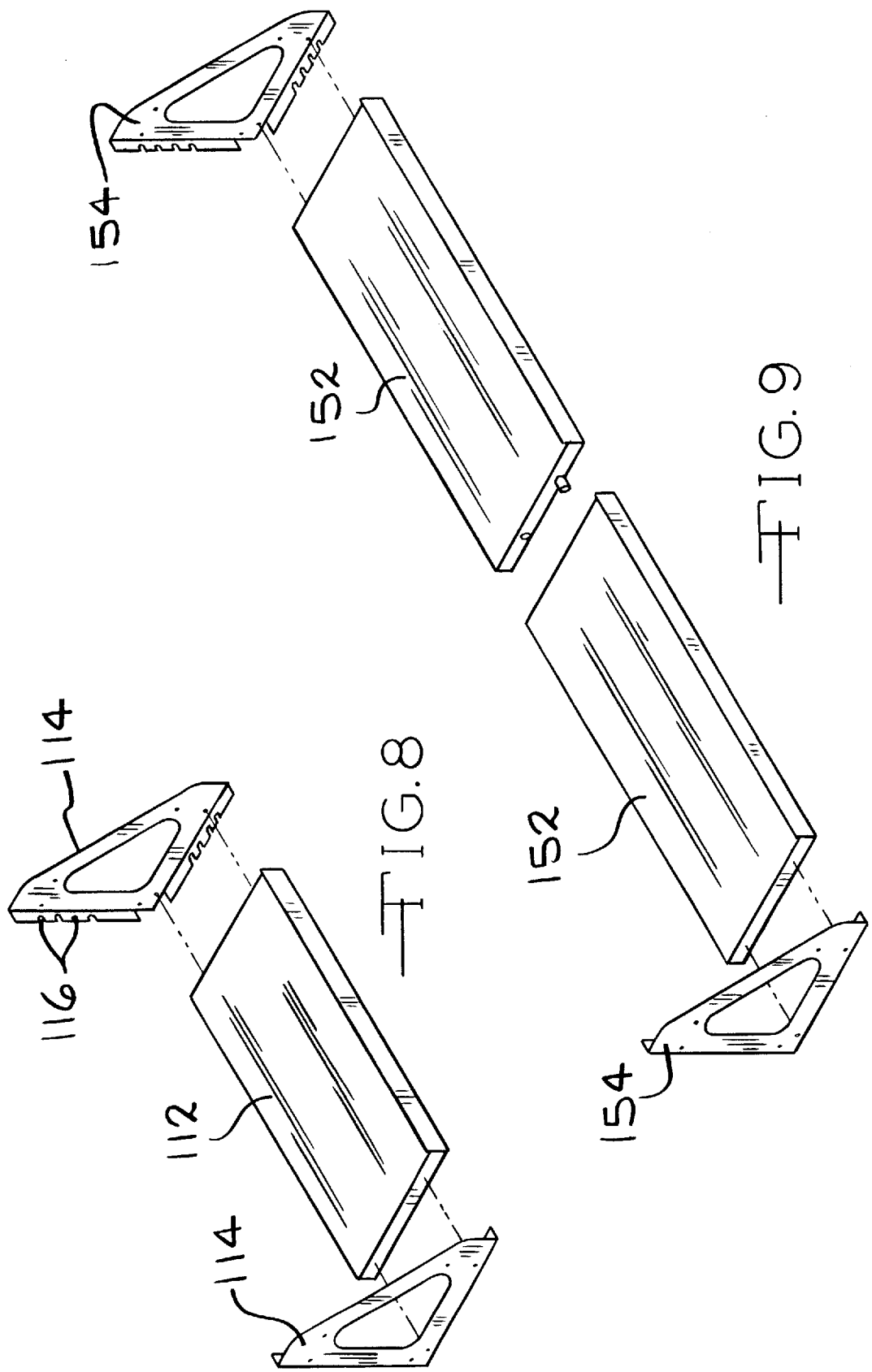

CABINET

BACKGROUND OF THE INVENTION

The present invention relates to a cabinet. More specifically, the invention is directed to a cabinet having inner and outer doors defining storage compartments in which a plurality of shelves are arranged to support articles thereon.

It has been found that there is a need for a compact cabinet that includes divided storage compartments having shelves for supporting articles, such as videotape cassettes and compact discs. The cabinet must maximize storage space. The present invention satisfies these needs.

SUMMARY OF THE INVENTION

The present invention is directed to a cabinet including, among other things, a right end and a left end spaced from one another. At least one inner door is pivotally mounted between open and closed positions on one of the ends. The inner door has an outside surface and an inside surface. At least one inner door shelf is mounted on the inside surface.

The cabinet includes at least one outer door pivotally mounted between open and closed positions on the end to which the inner door is mounted. The outer door has an outer surface and an inner surface. At least one outer door shelf is mounted on the inner surface. The outer door shelf is positioned between the inner surface and the outside surface when the inner and outer doors are closed.

The inner door defines a first compartment within the cabinet. The outer door defines a second compartment within the cabinet. The shelves mounted on the doors support articles in the compartments.

It is a primary object of the present invention to provide a cabinet having inner and outer doors to define storage compartments within the cabinet.

It is an important object of the present invention to provide a cabinet having a plurality of shelves to support articles within the cabinet.

Other objects and advantages of the present invention shall become apparent to those skilled in the art upon a review of the following detailed description of the preferred embodiment and the accompanying drawings.

BRIEF DESCRIPTION OF THE DRAWINGS

FIG. 6 is a is a perspective view similar to the view of FIG. 5 showing the attachment of a skirt to the bottom surface of the bottom;

FIG. 7 is a perspective view showing the back of the cabinet;

FIG. 8 is a perspective view of an inner door shelf;

FIG. 9 is a perspective view of outer door shelves;

DETAILED DESCRIPTION OF THE PREFERRED EMBODIMENTS

Figure 1:
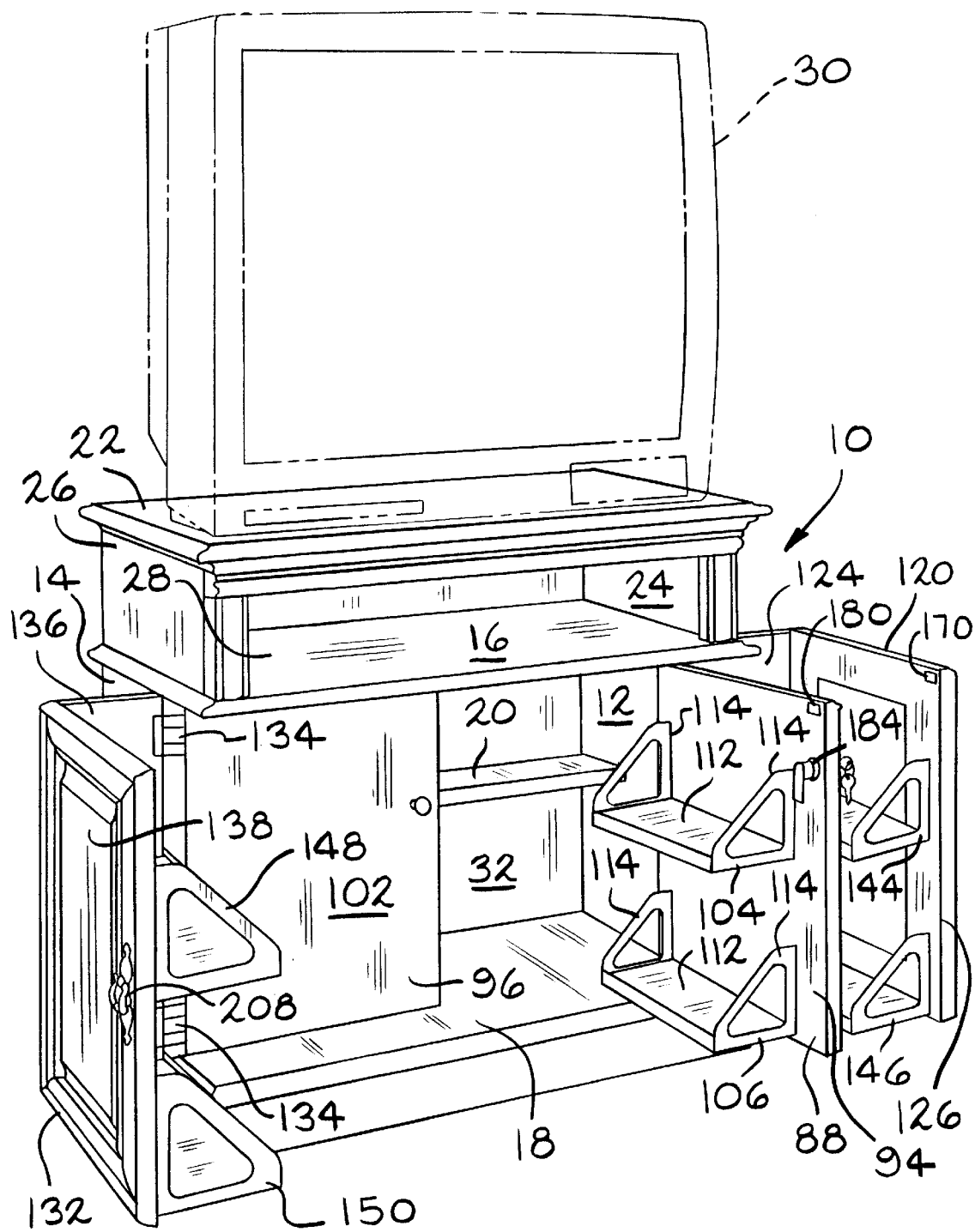
FIG. 1 is a perspective view of the cabinet of the present invention including a television set shown in broken lines.

The preferred embodiments and best mode of the present invention will now be described in detail with reference being made to the drawings. The cabinet according to the present invention is indicated generally in the drawings by the reference number "10".

Figure 5:
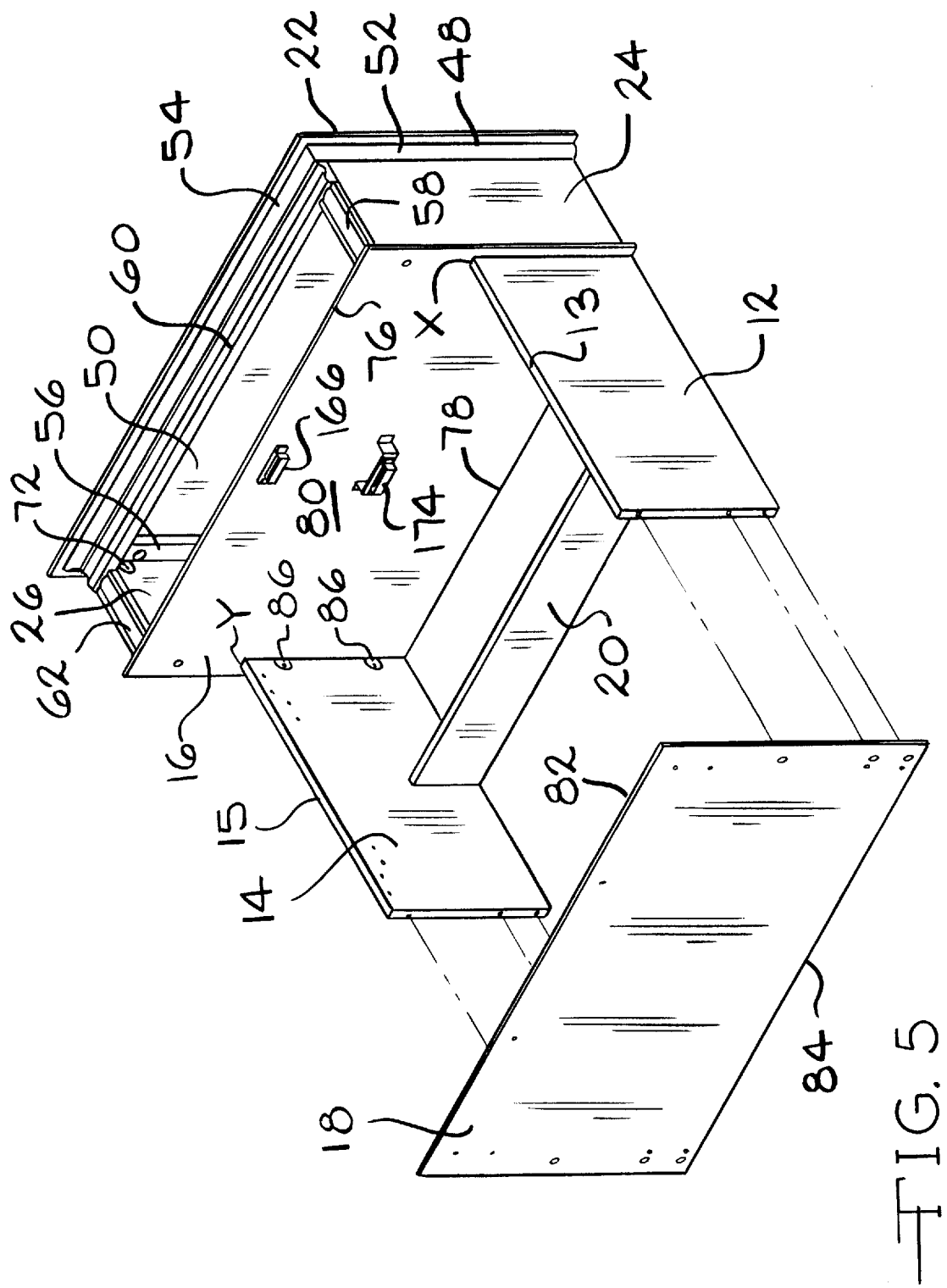
FIG. 5 is a perspective view showing a right end and a left end attached to the bottom surface of the upper shelf and a bottom according to the present invention.

Referring to FIGS. 1 and 5, the cabinet 10 includes a right end 12 and a left end 14 spaced from the right end 12. The right end includes a right edge 13 and the left end includes a left edge 15. The right and left ends 12 and 14 extend between an upper shelf 16 and a bottom 18. A small shelf 20 extends between the right and left ends 12 and 14. The cabinet 10 further includes a top 22, an upper right end 24 and an upper left end 26. The top 22 is spaced from the upper shelf 16. The upper right and left ends 24 and 26 extend between the top 22 and the upper shelf 16. As shown in FIG. 7, the cabinet 10 includes a back 32 that extends from the bottom 18 to the top 22. As shown in FIG. 1, the upper shelf 16, the top 22, the upper right end 24, the upper left end 26 and the back 32 define a space 28 for receiving, for example, a videotape cassette recorder (VCR) (not shown). The top 22 can support, for example, a television set 30.

Referring to FIGS. 6 and 7, a skirt 34 is mounted on the bottom surface 36 of the bottom 18. The skirt 34 includes a right side skirt 38, a front skirt 40 and a left side skirt 42. The right side skirt 38, the front skirt 40 and the left side skirt 42 are attached to the bottom surface 36 of the bottom 18 by a plurality of brackets 44 and screws 46.

Figure 2:
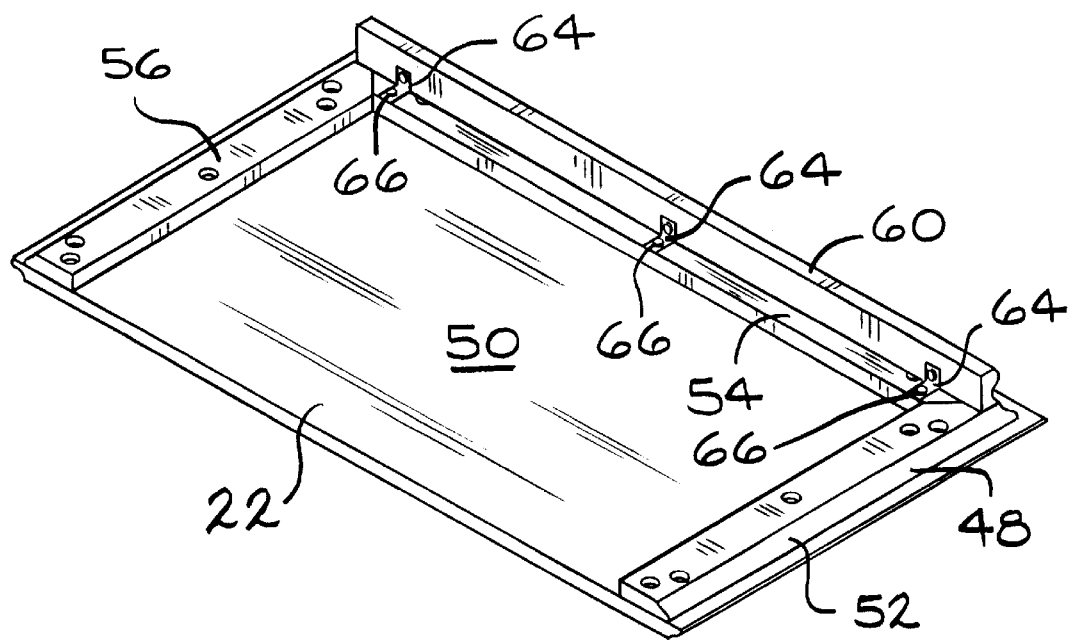
FIG. 2 is a perspective view of the bottom surface of the top of the cabinet with a right molding, a front molding, a left molding and a top molding positioned thereon.
Figure 3:
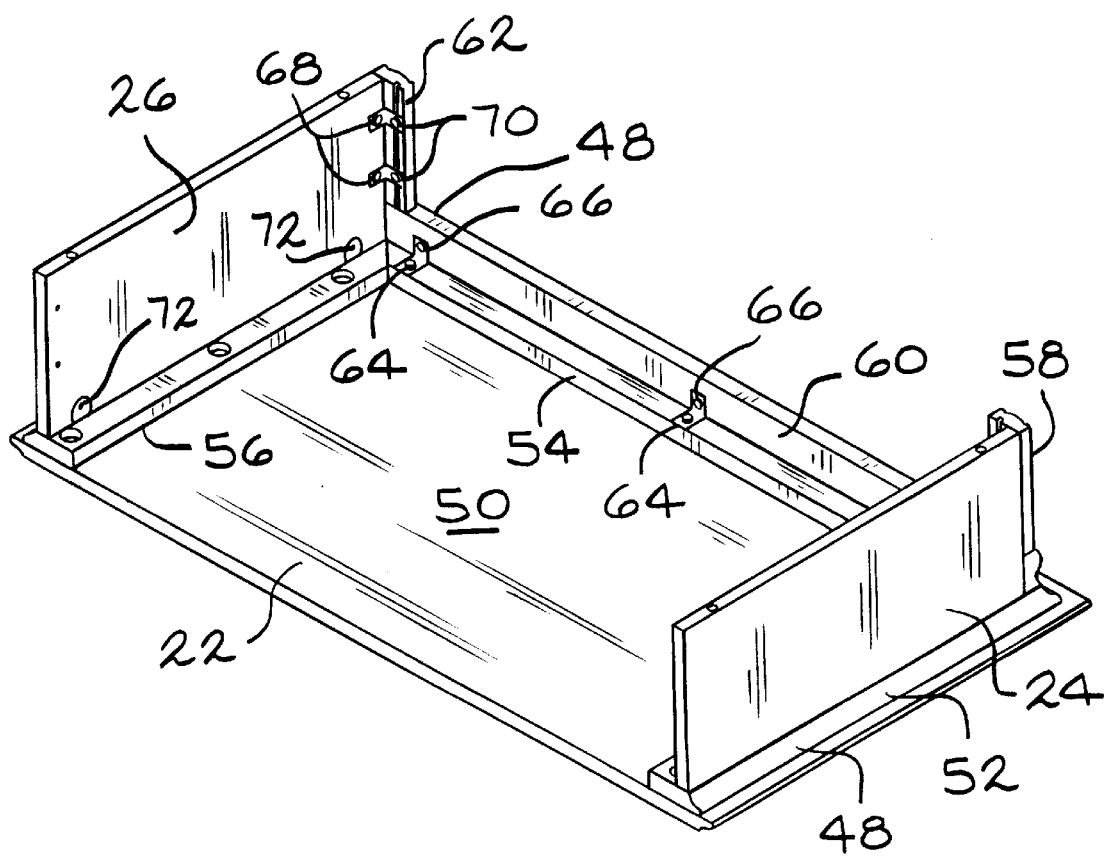
FIG. 3 is a view similar to the view of FIG. 2 with the addition of an upper right end, an upper left end, a right end molding and a left end molding.
Figure 4:
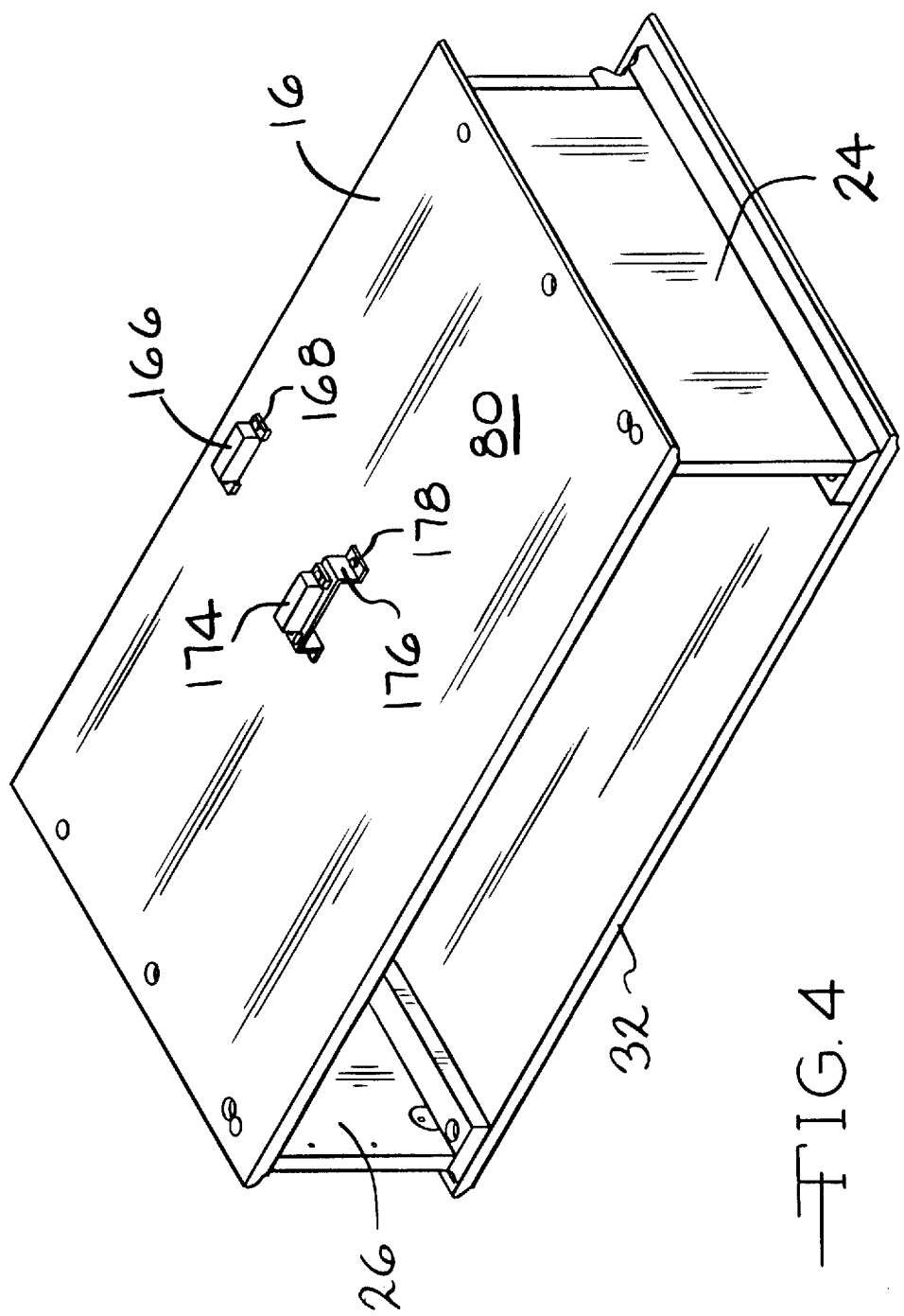
FIG. 4 is a perspective view showing the bottom surface of the upper shelf with an outer magnetic catch and an inner magnetic catch mounted thereon.

Referring now to FIGS. 2, 3 and 5, molding 48 is mounted adjacent the bottom surface 50 of the top 22. The molding 48 includes a right molding 52, a front molding 54, a left molding 56, a right end molding 58, a top molding 60 and a left end molding 62. The right molding 52, the front molding 54 and the left molding 56 are each attached to the bottom surface 50 of the top 22 by a plurality of screws (not shown). The top molding 60 is attached to the front molding 54 by a plurality of brackets 64 and screws 66. The right and left end moldings 58 and 62 are attached to the upper right and left ends 24 and 26, respectively, by a plurality of brackets 68 and screws 70.

Referring to FIG. 3, the upper right and left ends 24 and 26 are attached to the right and left moldings 52 and 56 by quick connection joint forming devices 72. The devices 72 are sold by Sauder Woodworking Co. under the designation TWIST-LOCK.

Referring to FIGS. 5–7, the upper shelf 16 includes a front edge 76, a back edge 78 and a bottom surface 80. The bottom 18 includes a front edge 82 and a back edge 84. As shown in FIG. 5, the right and left ends 12 and 14 each extends from the back edges 78 and 82 of the upper shelf 16 and the bottom 18, respectively, to points X and Y positioned between the back edges 78 and 84 and the front edges 76 and 82 of the upper shelf 16 and the bottom 18, respectively. The points X and Y are defined by the right and left edges 13 and 15 of the right and left ends 12 and 14, respectively. Still referring to FIG. 5, the right and left ends 12 and 14 are each attached to the bottom surface 80 of the upper shelf 16 by joint forming devices 86, which are of the type identified above. The right and left ends 12 and 14 are attached to the bottom 18 by a plurality of screws (not shown).

Referring to FIGS. 1, 10, 13 and 14, the cabinet 10 includes a right inner door 88 pivotally mounted by hinges 90 between open and closed positions on the right edge 13 of the right end 12. The right inner door 88 includes a right outside surface 92 and a right inside surface 94. The cabinet 10 further includes a left inner door 96 pivotally mounted by hinges 98 between open and closed positions on the left edge 15 of the left end 14. The left inner door 96 has a left inside surface 100 and a left outside surface 102.

Figure 10:
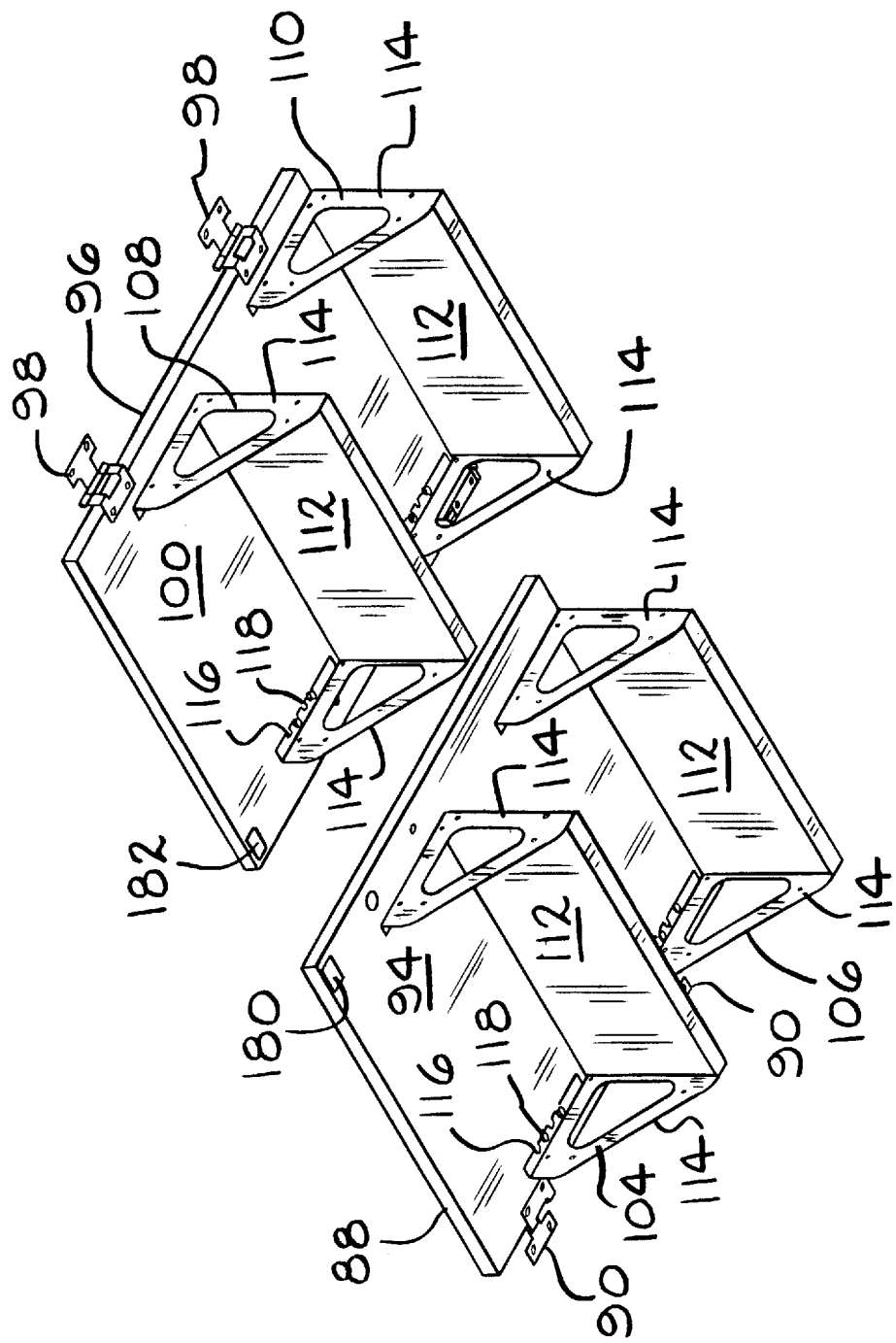
FIG. 10 is a perspective view of the right and left inner doors.

Referring to FIGS. 1, 8, 10 and 13, the cabinet 10 includes a first right inner door shelf 104 and a second right inner door shelf 106 that are mounted on the right inside surface 94 of the right inner door 88. The cabinet 10 further includes a first left inner door shelf 108 and a second left inner door shelf 110 that are mounted on the left inside surface 100 of the left inner door 96. Each of the right and left inner door shelves 104, 106, 108 and 110 includes an inner base 112 extending between two adjustable inner brackets 114. As shown in FIG. 10, each of the inner brackets 114 includes a plurality of grooves 11 6 that receive screws 118 in order to adjustably mount the brackets 114 and thereby the shelves 104, 106, 108 and 110 on the right and left inside surfaces 94 and 100.

Figure 13:
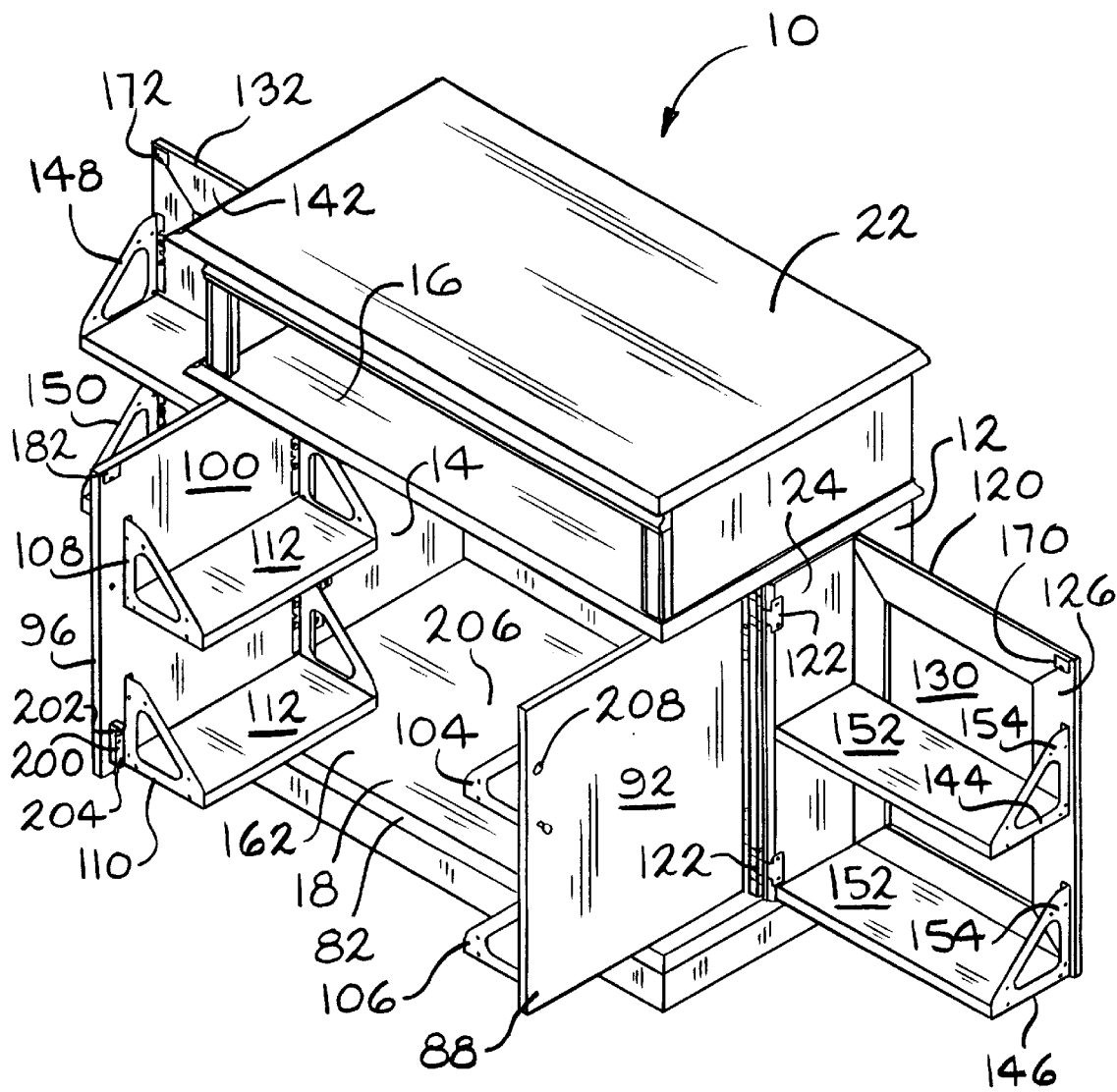
FIG. 13 is a perspective view showing the cabinet of the present invention in a fully open position.
Figure 14:
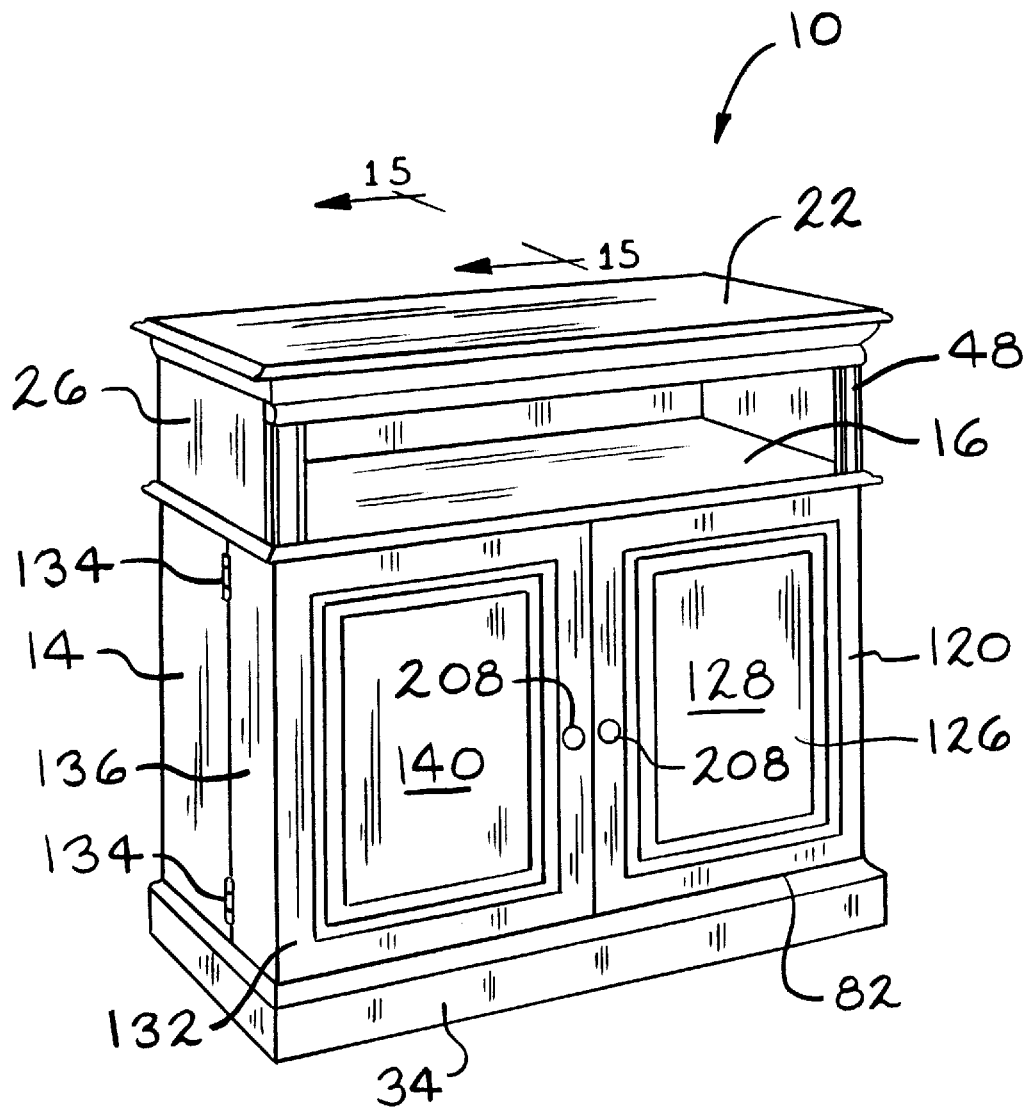
FIG. 14 is a perspective view of the cabinet in a fully closed position.

Referring to FIGS. 1, 11, 13 and 14, the cabinet 10 includes a right outer door 120 pivotally mounted by hinges 122 between open and closed positions on the right edge 13 of the right end 12. The right outer door 120 includes a right door end 124 and a right door front 126. The right door end 124 and the right door front 126 are joined in a perpendicular relationship. As shown in FIG. 13, the right door end 124 is attached to the right end 12 by the hinges 122. When the cabinet 10 is in the closed position as shown in FIG. 14, the right door end 124 extends from the right end 12, which is at the point X as shown in FIG. 5, to the front edge 82 of the bottom 18 to complete the right side of the cabinet. The right door front 126 has a right outer surface 128 and a right inner surface 130.

Still referring to FIGS. 1, 11, 13 and 14, the cabinet 10 includes a left outer door 132 pivotally mounted by hinges 134 between open and closed positions on the left edge 15 of the left end 14. The left outer door 132 includes a left door end 136 and a left door front 138. The left door end 136 is arranged in a perpendicular relationship to the left door front 138. The left door end 136 is attached by the hinges 134 to the left end 14. When the cabinet 10 is in a closed position as shown in FIG. 14, the left door end 136 extends from the left end 14, which is at the point Y as shown in FIG. 5, to the front edge 82 of the bottom 18 to complete the left side of the cabinet. The left door front 138 has a left outer surface 140 and a left inner surface 142.

Figure 11:
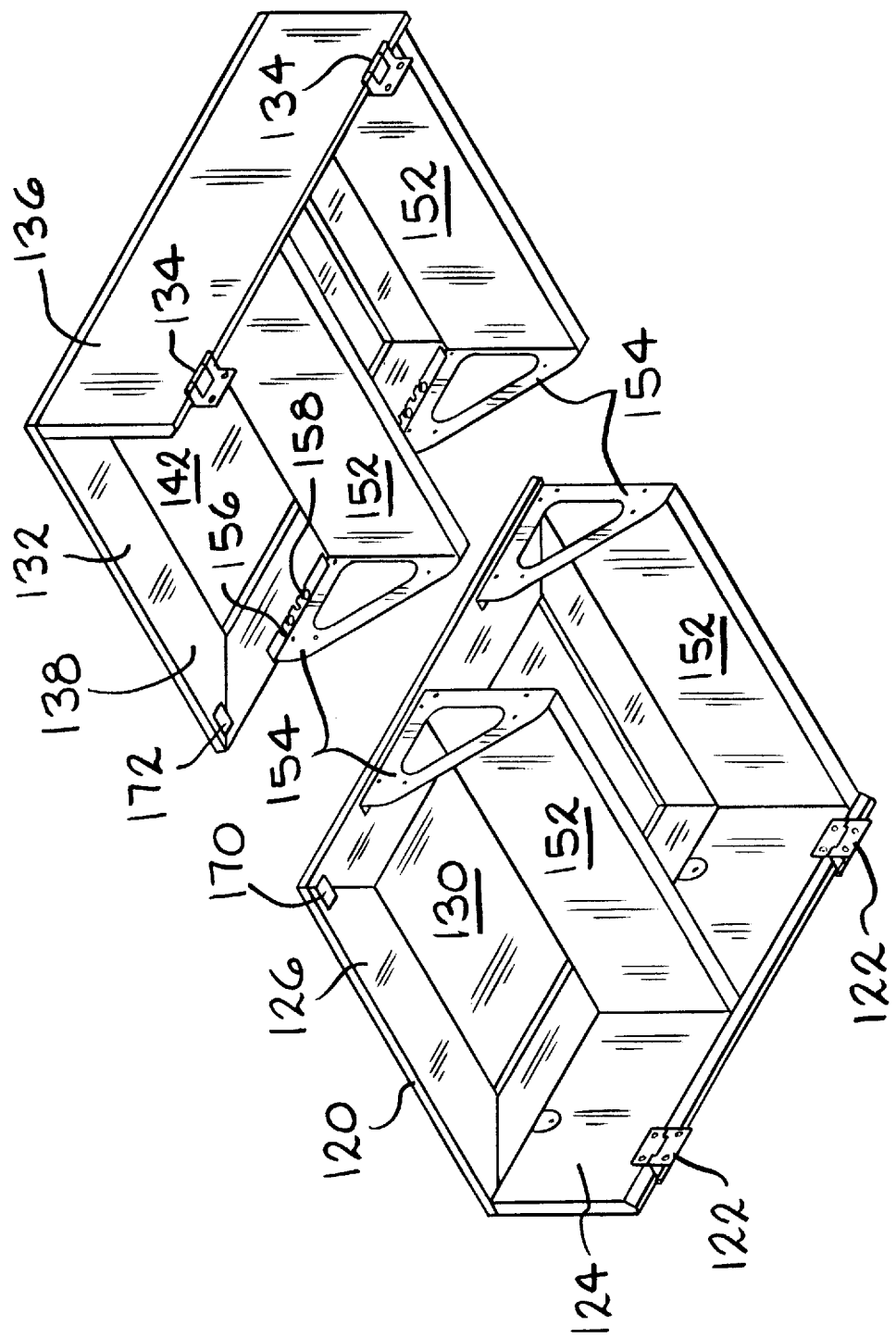
FIG. 11 is a perspective view of the right and left outer doors.

Referring to FIGS. 1, 9, 11 and 13, the cabinet 10 includes a first right outer door shelf 144 and a second right outer door shelf 146 mounted on the right inner surface 130 of the right outer door 120. The cabinet 10 further includes a first left outer door shelf 148 and a second left outer door shelf 150. As shown in FIG. 9, each of the shelves 144, 146, 148 and 150 includes an outer base 152 and one outer bracket 154. The first and second right outer door shelves 144 and 146 extend between the right door end 124 and the outer brackets 154. The first and second left outer door shelves 148 and 150 extend between the left door end 136 and the outer brackets 154. As shown in FIG. 11, the outer door brackets 154 each includes a plurality of grooves 156 that can receive screws 158 to adjustably mount the brackets 154 and thus the shelves 144, 146, 148 and 150 on the right and left inner surfaces 130 and 142.

Figure 15:
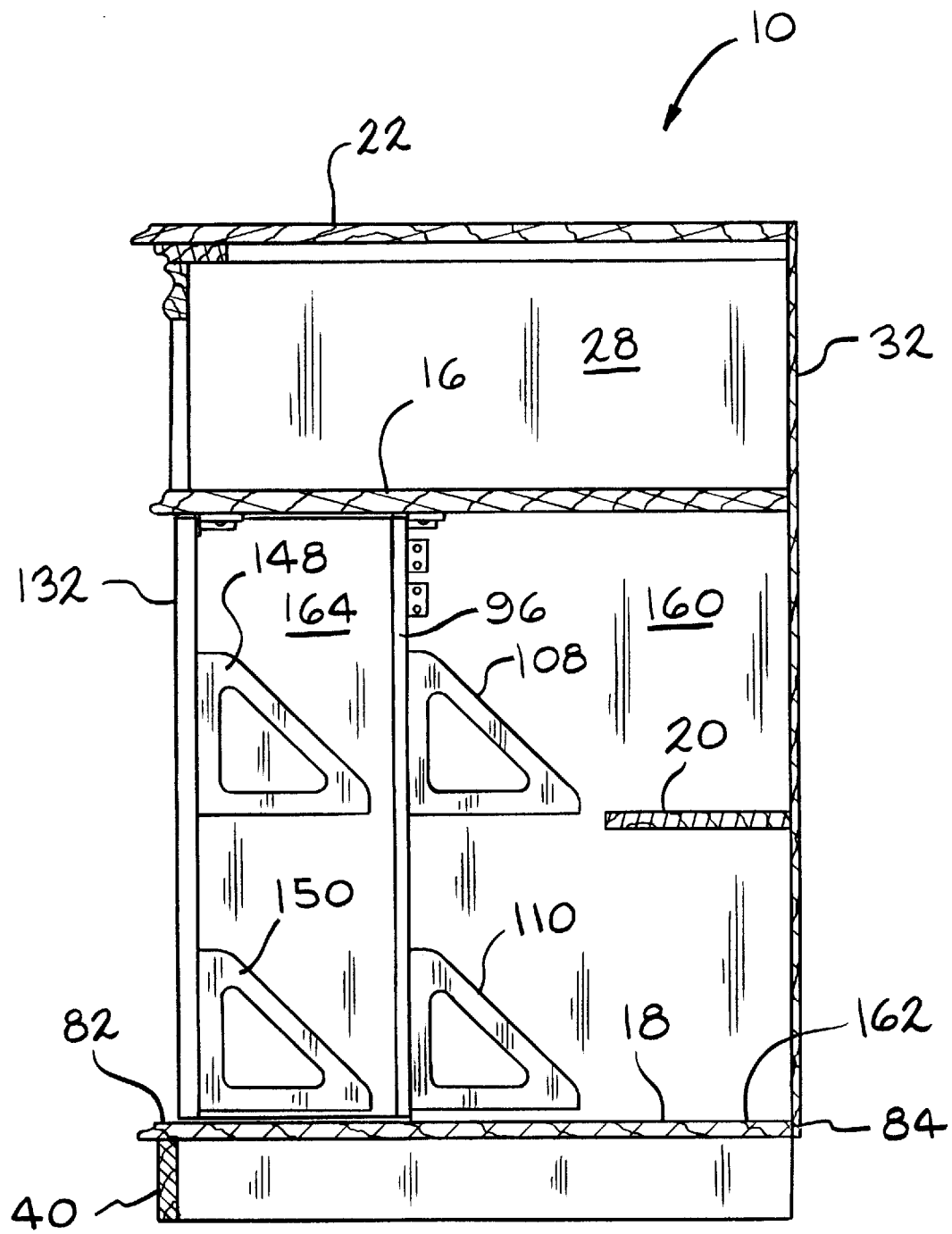
FIG. 15 is a cross-sectional view taken through line 15—15 of FIG. 14.

Referring to FIGS. 14 and 15, when the cabinet 10 is in a fully closed position, the right and left inner doors 88 and 96, the right and left ends 12 and 14, the bottom 18, the top 22 and the back 32 define an inner space 160. The inner space 160 contains the small shelf 20, the first and second right inner door shelves 104 and 106 and the first and second left inner door shelves 108 and 110. Articles can be positioned on these shelves and also on the top surface 162 of the bottom 18. The right and left door fronts 126 and 138, the right and left door ends 124 and 136 and the right and left inner doors 88 and 96 define an outer space 164. The first and second right outer door shelves 144 and 146 and the first and second left outer door shelves 148 and 150 are contained in the outer space 164. These shelves are positioned between the right and left inner surfaces 130 and 142 of the right and left door fronts 126 and 138 and the right and left outside surfaces 92 and 102 of the right and left inner doors 88 and 96. Articles can be placed on these shelves for storage in the outer space 164. As previously mentioned, the cabinet 10 can store videotape cassettes and compact discs. It has been found that the cabinet 10 can contain 158 cardboard case videotape cassettes or 256 compact discs. Accordingly, the present invention provides a compact storage cabinet that is a major advancement over prior art cabinets.

Referring to FIGS. 1, 4, 11, 13 and 14, the cabinet 10 includes an outer magnetic catch 166 mounted by screws 168 on the bottom surface 80 of the upper shelf 16. The outer magnetic catch 166 mates with a right outer strike plate 170 mounted on the right outer door 120 and a left outer strike plate 172 mounted on the left outer door 132. The outer magnetic catch 166 cooperates with the right and left outer strikes plates 170 and 172 to maintain the right and left outer doors 120 and 132 in closed positions as shown in FIG. 14.

Referring to FIGS. 1, 4, 10, 13 and 14, the cabinet 10 includes an inner magnetic catch 174 mounted by a bracket 176 and screws 178 on the bottom surface 80 of the upper shelf 16. A right inner strike plate 180 is mounted on the right inside surface 94 of the right inner door 88. A left inner strike plate 182 is mounted on the left inside surface 100 of the left inner door 96. The right and left inner strike plates 180 and 182 cooperate with the inner magnetic catch 174 to maintain the right and left inner doors 88 and 96 in a closed position.

Figure 12:
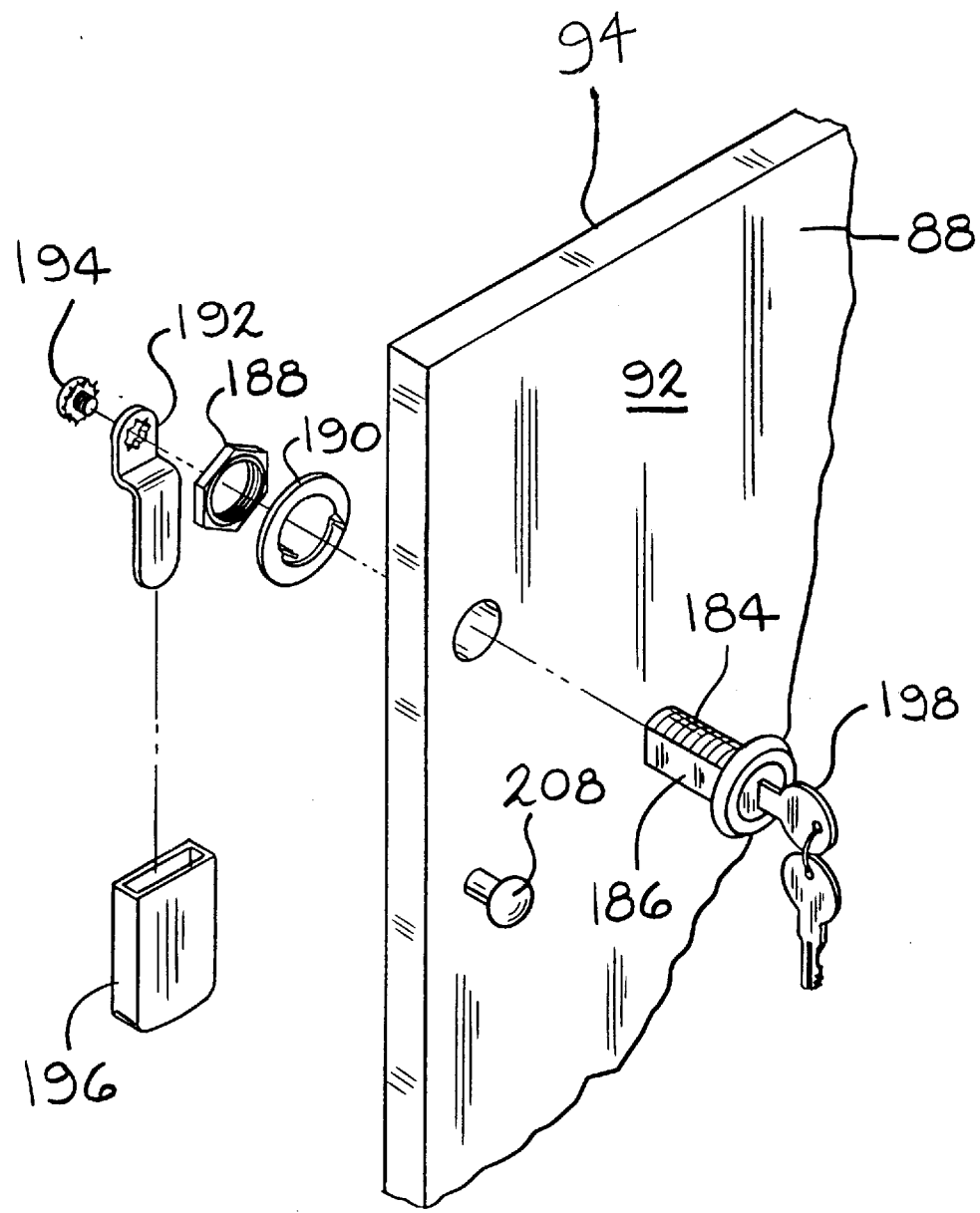
FIG. 12 is a detailed view of the lock for the inner doors according to the present invention.

Referring to FIGS. 1 and 12, the cabinet 10 includes a lock 184 positioned on the right inner door 88. As shown in FIG. 12, the lock 184 includes a cylinder 186 that extends between the right outside surface 92 and the right inside surface 94 of the right inner door 88. A nut 188 and a washer 190 affix the cylinder 186 to the right inner door 88. A cam 192 is movably positioned on the cylinder 186 by a screw 194. A rubber sleeve 196 is positioned on the cam 192. The cylinder 186 receives a key 198. Movement of the key 198 causes corresponding movement of the cam 192. When the right and left inner doors 88 and 96 are closed, the cylinder 186 can be actuated by the key 98 to cause the cam 192 to be positioned adjacent the left inside surface 100 of the left inner door 96. This causes the right inner door 88 to be locked in a closed position with the left inner door 96 in order to prevent access to the inner space 160 as shown in FIG. 15.

As shown in FIG. 13, the cabinet 10 includes a door catch 200 consisting of a catch bracket 202 and a plunger 204 mounted on the left inside surface 100 of the left inner door 96. The plunger 204 is received by an opening 206 on the top surface 162 of the bottom 18. When the plunger 204 is in the up position, the left inner door 96 is free to pivot on the hinges 98. When the plunger 204 is in the down position and received by the opening 206, the left inner door 96 is locked in a closed position.

Referring to FIGS. 1, 12 and 14, the right and left inner doors 88 and 96 and the right and left outer doors 120 and 132 each includes a knob 208 that can be grasped to open and close the doors. The shape, size and composition of the knobs 208 can vary depending upon the style and use of the cabinet 10.

An alternative embodiment cabinet according to the present invention is shown in FIGS. 16–21. The alternative embodiment cabinet is generally indicated in the drawings by the reference number "310".

Figure 16:
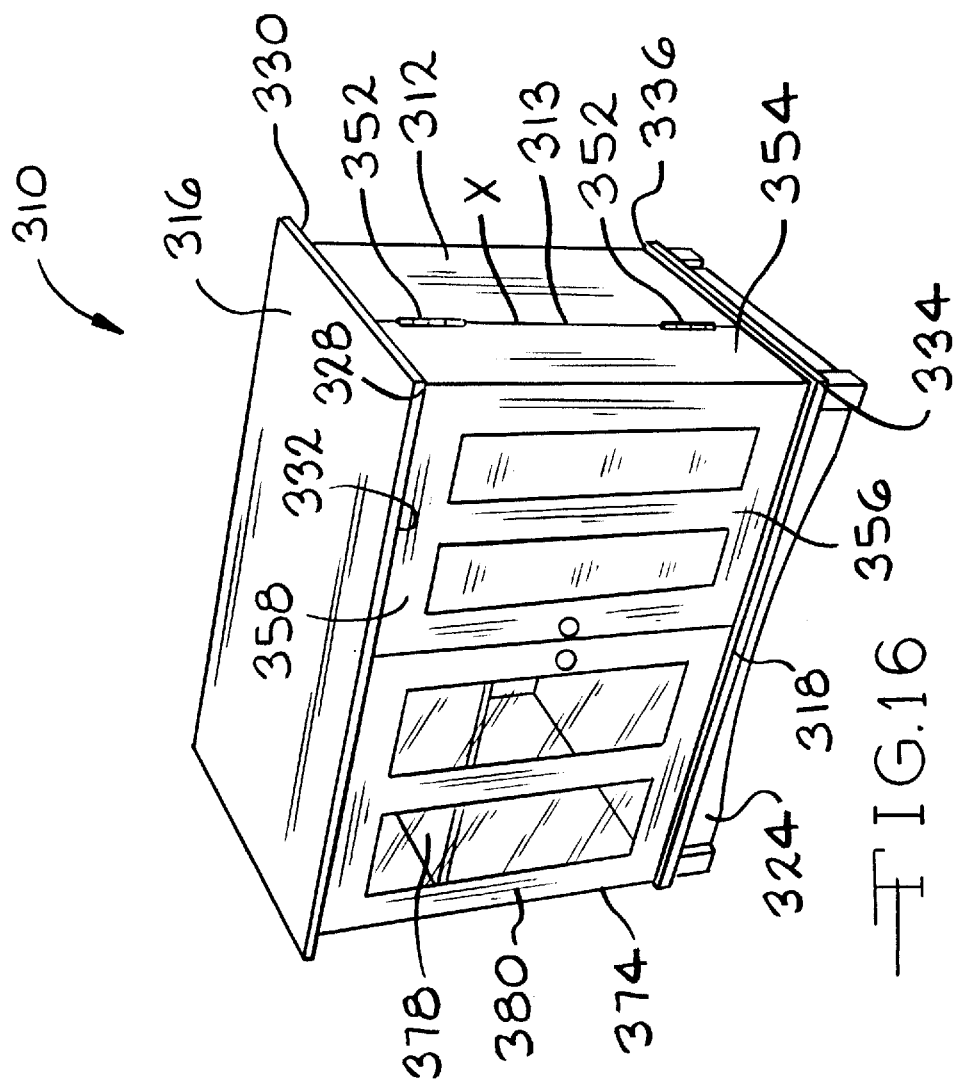
FIG. 16 is a perspective view of an alternative embodiment cabinet according to the present invention in a closed position.
Figure 17:
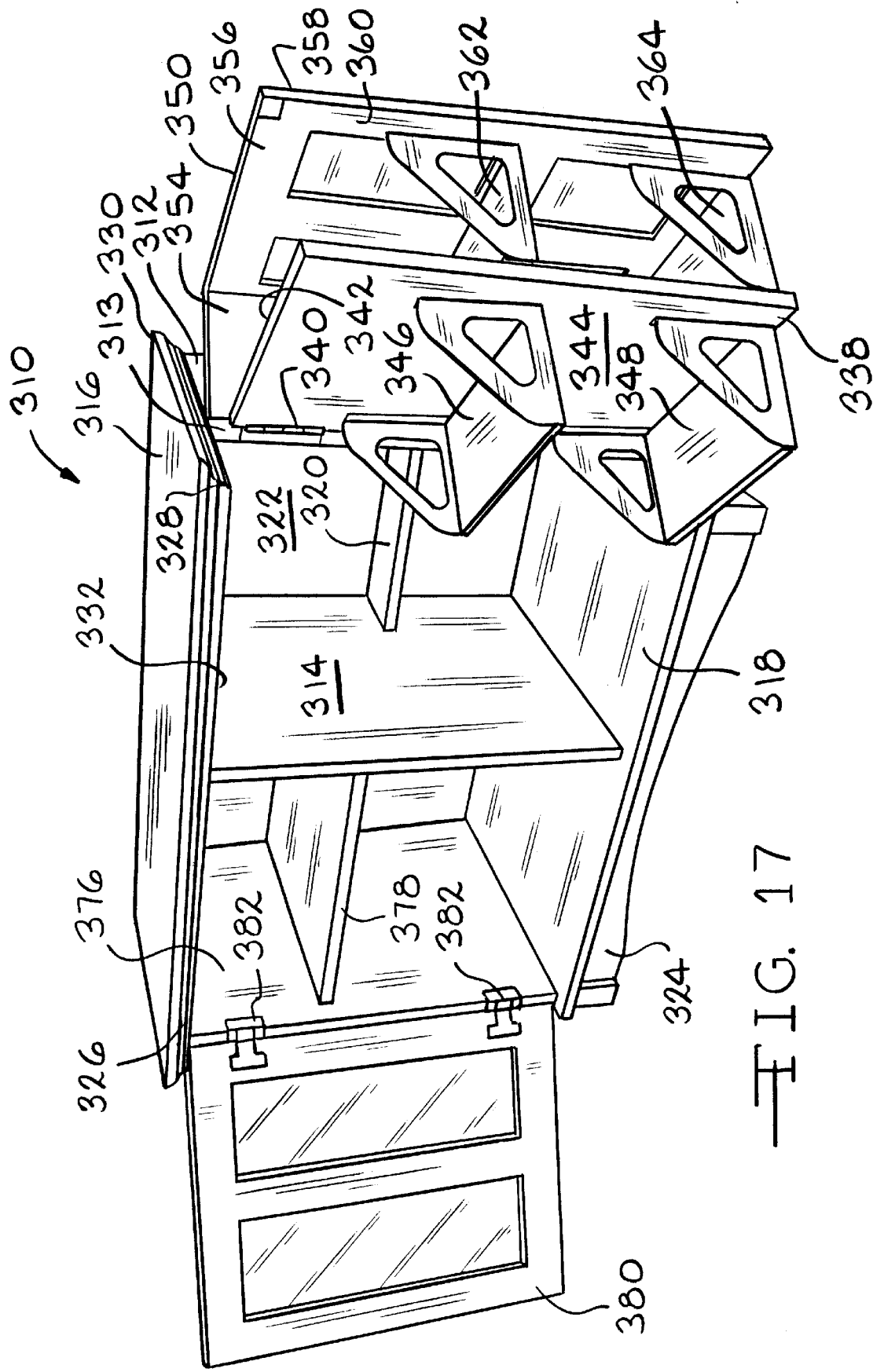
FIG. 17 is a perspective view of the alternative embodiment cabinet in an open position.
Figure 18:
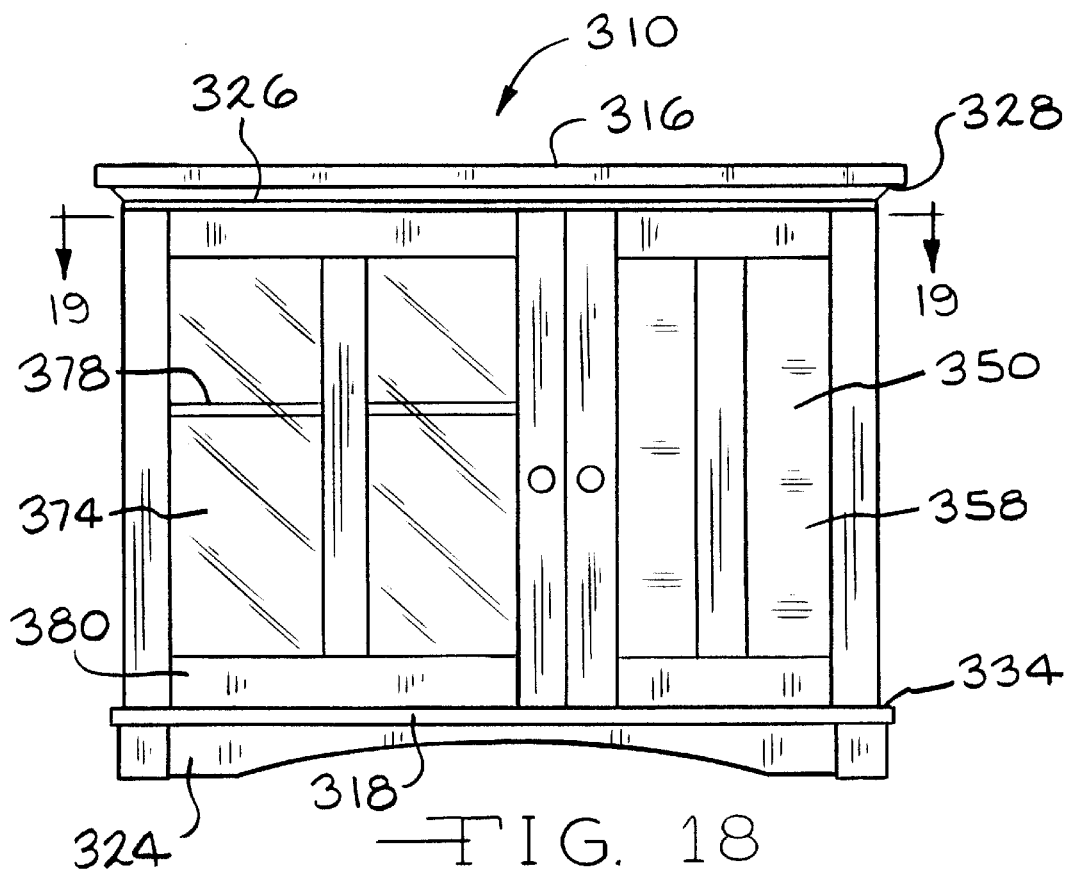
FIG. 18 is a front elevational view of the alternative embodiment cabinet.

Referring to FIGS. 16–18, the cabinet 310 includes an end 312 and a center wall 314 spaced from the end 312. The end 312 includes an edge 313. The end 312 and the center wall 314 extend between a top 316 and a bottom 318. A small shelf 320 extends between the end 312 and the center wall 314. In the present embodiment, the cabinet 310 does not include an upper shelf, an upper right end, or an upper left end as described above. However, it should be understood that these features can be included in the cabinet 310. As shown in FIG. 17, the cabinet 310 includes a back 322 that extends from the bottom 318 to the top 316.

As shown in FIGS. 17 and 18, the cabinet 310 includes a skirt 324 adjacent the bottom 318. Molding 326 is positioned adjacent the top 316. The skirt 324 and the molding 326 can be of the type described above.

Referring to FIGS. 16 and 17, the top 316 includes a front edge 328, a back edge 330 and a bottom surface 332. The bottom 318 includes a front edge 334 and a back edge 336. As shown in FIG. 16, the end 312 extends from the back edges 330 and 336 of the top 316 and the bottom 318, respectively, to a point X positioned between the back edges 330 and 336 and the front edges 328 and 334 of the top 316 and the bottom 318, respectively. The point X is defined by the edge 313 of the end 312.

Referring to FIGS. 16 and 17, the cabinet 310 includes an inner door 338 pivotally mounted by hinges 340 between open and closed positions on the edge 313 of the end 312. The inner door 338 includes an outside surface 342 and an inside surface 344. The cabinet 310 includes a first inner door shelf 346 and a second inner door shelf 348 that are mounted on the inside surface 344 of the inner door 338. The first and second inner door shelves 346 and 348 are described above.

Figure 19:
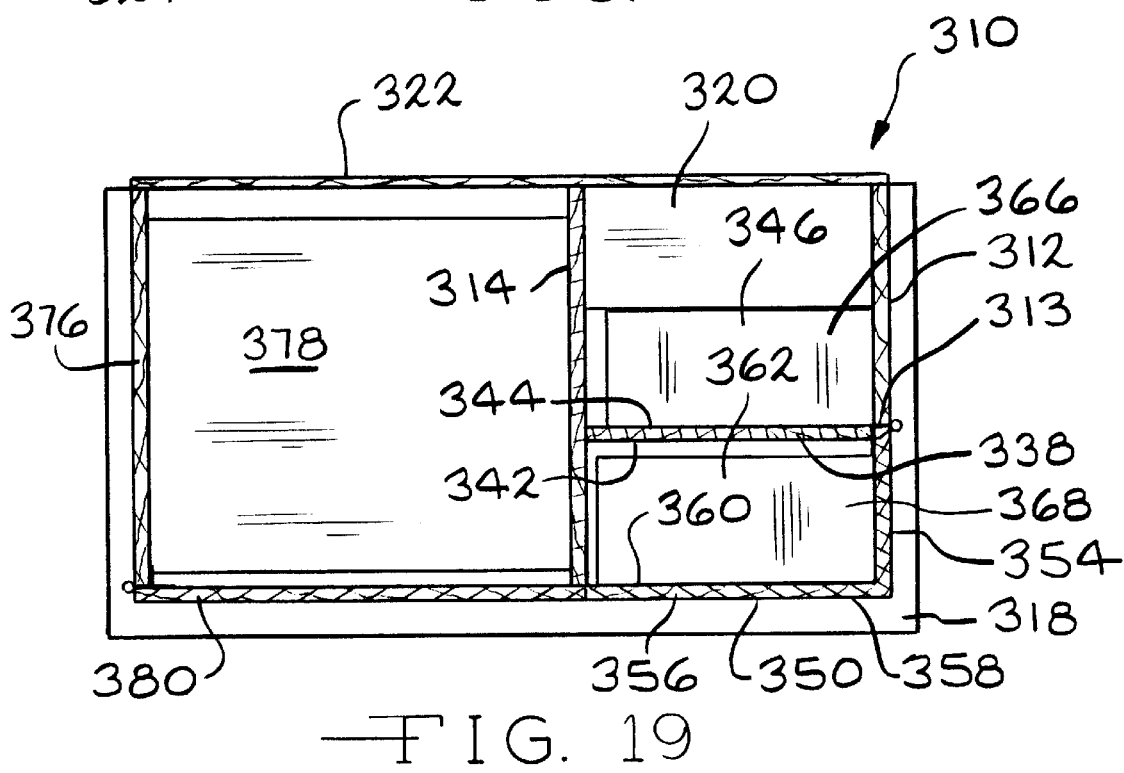
FIG. 19 is a cross-sectional view taken through line 19—19 of FIG. 18.

Still referring to FIGS. 16 and 17, the cabinet includes an outer door 350 pivotally mounted by hinges 352 between open and closed positions on the edge 313 of the end 312. The outer door 350 includes a door end 354 and a door front 356. The door end 354 and the door front 356 are jointed in a perpendicular relationship. As shown in FIG. 19, the door end 354 is attached to the end 312 by the hinges 352. When the cabinet 310 is in the closed position, the door end 354 extends from the end 312, which is at the point X, to the front edge 334 of the bottom 318 to complete the right side of the cabinet. The door front 356 has an outer surface 358 and an inner surface 360.

As shown in FIG. 17, the cabinet 310 includes a first outer door shelf 362 and a second outer door shelf 364 mounted on the inner surface 360 of the outer door 350. The first and second outer doors shelves 362 and 364 have been described above.

Referring to FIGS. 17 and 19, when the cabinet 310 is in a fully closed position, the inner door 338, the end 312, the top 316, the bottom 318 and the back 322 define an inner space 366. The inner space 366 contains the small shelf 320 and the first and second inner door shelves 346 and 348. Articles can be placed on the shelves 320, 346 and 348 for storage in the inner space 366. The front door 356, the door end 354, the center wall 314 and the inner door 338 define an outer space 368. The first and second outer door shelves 362 and 364 are contained in the outer space 368. The shelves 362 and 364 are positioned between the inner surface 360 of the outer door 350 and the outside surface 342 of the inner door 338. Articles can be placed on the shelves 362 and 364 for storage in the outer space 368. The cabinet 310 can include magnetic catch devices for the inner and outer doors 338 and 350 as described above. Further, the inner door 338 can includes a lock to lock the inner door in a closed position.

Figure 20:
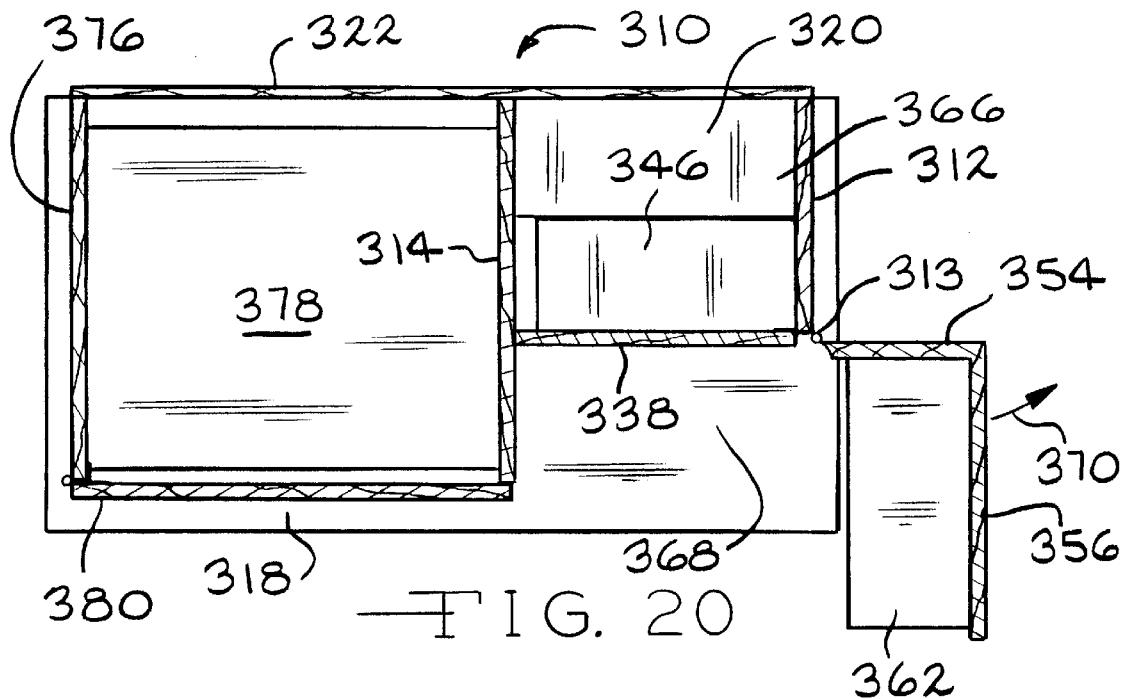
FIG. 20 is a view similar to the view of FIG. 19 with the outer door open.
Figure 21:
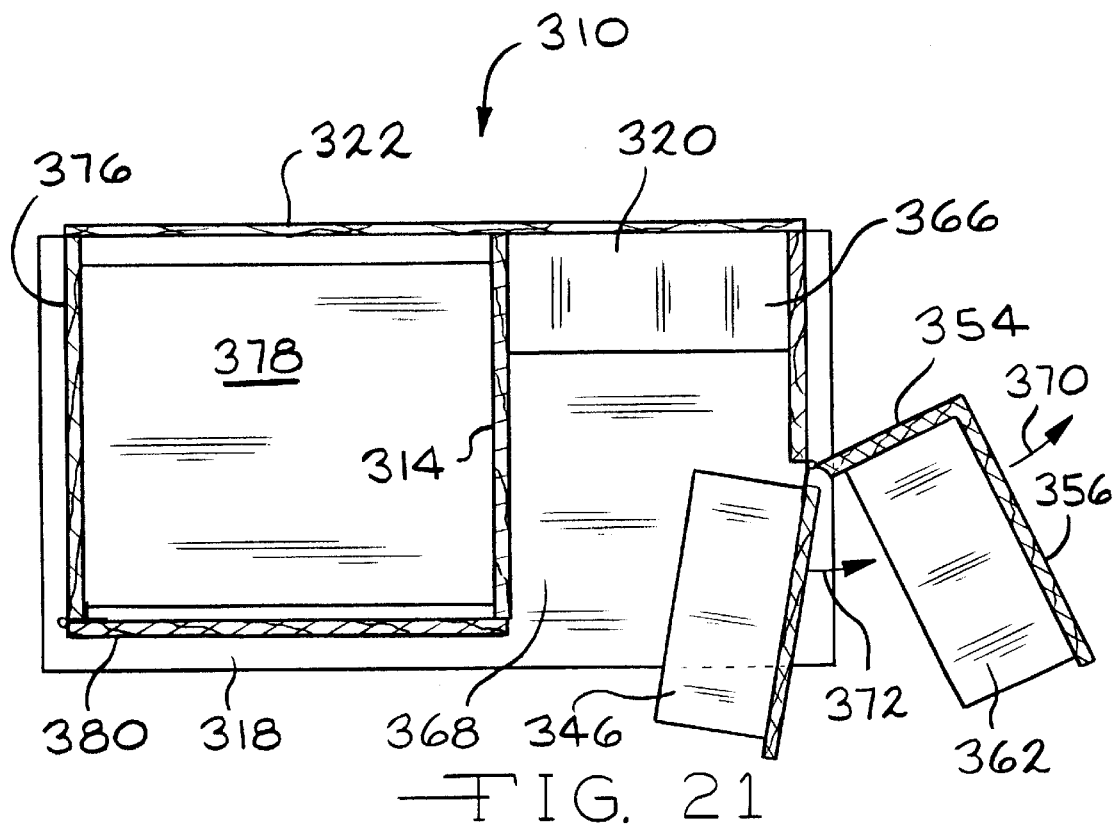
FIG. 21 is a view similar to the view of FIG. 20 with the inner and outer doors open.

Referring to FIG. 20, the outer door 350 can be moved from a closed position to an open position by moving the outer door in the direction indicated by the arrow 370. This provides access to the outer space 368. Referring to FIG. 21, the inner door 338 can be moved from a closed position to an open position by moving the inner door in the direction indicated by the arrow 372. This provides access to the inner space 366.

Referring to FIG. 16, the cabinet 310 includes an article storage and positioning portion 374. Referring to FIGS. 17 and 19, the portion 374 is defined by the center wall 314, a side wall 376, which is spaced from the center wall, the top 316 and the bottom 318. At least one shelf 378 extends between the side wall 376 and the center wall 314. The shelf 378 can store and position, for example, stereo components (not shown). A storage door 380 is pivotally mounted on the side wall 376 by hinges 382.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A cabinet, comprising:
   at least one end having an edge;
   at least one inner door pivotally mounted between open and closed positions on said edge of said end, said inner door having an outside surface and an inside surface, at least one inner door shelf being mounted on said inside surface; and
   at least one outer door having a door end and a door front, said door end and said door front being joined in a substantially perpendicular relationship, said outer door pivotally mounted between open and closed positions by said door end on said edge of said end, said door front having an outer surface and an inner surface, at least one outer door shelf being mounted on said inner surface, said outer door shelf being positioned between said inner surface and said outside surface when said inner and outer doors are closed.

2. A cabinet, comprising:

a right end having a right edge;

a left end spaced from said right end, said left end having a left edge;

a right inner door pivotally mounted between open and closed positions on said right edge of said right end, said right inner door having a right outside surface and a right inside surface, at least one right inner door shelf being mounted on said right inside surface;

a left inner door pivotally mounted between open and closed positions on said left edge of said left end, said left inner door having a left inside surface and a left outside surface, at least one left inner door shelf being mounted on said left inside surface;

a right outer door having a right door end and a right door front, said right door end and said right door front being joined in a substantially perpendicular relationship, said right outer door pivotally mounted between open and closed positions by said right door end on said right edge of said right end, said right door front having a right outer surface and a right inner surface, at least one right outer door shelf being mounted on said right inner surface, said right outer door shelf being positioned between said right inner surface and said right outside surface when said right inner and outer doors are closed; and a left outer door having a left door end and a left door front, said left door end and said right door front being joined in a substantially perpendicular relationship, said left outer door pivotally mounted between open and closed positions by said left door end on said left edge of said left end, said left door front having a left outer surface and a left inner surface, at least one left outer door shelf being mounted on said left inner surface, said left outer door shelf being positioned between said left inner surface and said left outside surface when said left inner and outer doors are closed.

3. The cabinet of claim 2, wherein said cabinet includes a small shelf extending between said right and left ends.

4. The cabinet of claim 2, wherein said cabinet includes an upper shelf and a bottom, said right and left ends extending between said upper shelf and said bottom.

5. The cabinet of claim 4, wherein said cabinet includes a top, an upper right end and an upper left end, said top being spaced from said upper shelf, said upper right and left ends extending between said top and said upper shelf.

6. The cabinet of claim 5, wherein said cabinet includes skirt means for providing a skirt adjacent said bottom.

7. The cabinet of claim 6, wherein said skirt means consists of a right side skirt, a front skirt and a left side skirt.

8. The cabinet of claim 5, wherein said cabinet includes molding means for providing a molding adjacent said top.

9. The cabinet of claim 8, wherein said molding means consists of a right molding, a front molding, a left molding, a right end molding, a top molding and a left end molding.

10. The cabinet of claim 4, wherein said upper shelf and said bottom each includes a front edge and a back edge, said right and left ends each extending from said back edges to points positioned between said back edges and said front edges.

11. The cabinet of claim 10, wherein said right and left door ends extend from said right and left ends, respectively, to said front edges when said right and left outer doors are closed.

12. The cabinet of claim 4, wherein said cabinet includes outer doors closing means for maintaining said right and left outer doors in closed positions.

13. The cabinet of claim 12, wherein said outer doors closing means consists of an outer magnetic catch mounted on said upper shelf, a right outer strike plate mounted on said right outer door and a left outer strike plate mounted on said left outer door.

14. The cabinet of claim 4, wherein said cabinet includes inner doors closing means for maintaining said right and left inner doors in closed positions.

15. The cabinet of claim 14, wherein said inner doors closing means consists of an inner magnetic catch mounted on said upper shelf, a right inner strike plate mounted on said right inner door and a left inner strike plate mounted on said left inner door.

16. The cabinet of claim 2, wherein at least one of said right and left inner doors includes lock means for locking said inner doors in closed positions.

17. The cabinet of claim 16, wherein said lock means consists of a lock in communication with a cam.

18. The cabinet of claim 2, wherein said right and left inner door shelves each includes an inner base and two inner brackets.

19. The cabinet of claim 11, wherein said right and left outer door shelves each includes an outer base and one outer bracket, said outer base extending between said right and left door ends, respectively, and said outer bracket.

20. The cabinet of claim 2, wherein at least one of said right and left inner doors includes door catch means for maintaining one of said doors in a closed position.

21. The cabinet of claim 20, wherein said door catch means consists of a catch bracket and a plunger.

22. A cabinet, comprising:

at least one end having an edge;

at least one center wall spaced from said end;

at least one inner door pivotally mounted between open and closed positions on said edge of said end, said inner door having an outside surface and an inside surface, at least one inner door shelf being mounted on said inside surface, said inner door being adjacent said center wall when said inner door is in said closed position; and at least one outer door having a door end and a door front, said door end and said door front being joined in a substantially perpendicular relationship, said outer door pivotally mounted between open and closed positions by said door end on said edge of said end, said door front having an outer surface and an inner surface, at least one outer door shelf being mounted on said inner surface, said outer door shelf being positioned between said inner surface and said outside surface when said inner and outer doors are closed, said outer door being adjacent said center wall when said outer door is in said closed position.

23. The cabinet of claim 22 wherein said cabinet further includes a side wall spaced from said center wall, at least one shelf extending between said side wall and said center wall.

24. The cabinet of claims 23, wherein said cabinet further includes at least one door pivotally mounted on said side wall.

* * * * *